United States Patent Office 3,634,331
Patented Jan. 11, 1972

3,634,331
ZEOLITE AGGLOMERATE
Richard J. Neddenriep, Williamsville, N.Y., assignor to Union Carbide Corporation
No Drawing. Filed Feb. 5, 1968, Ser. No. 702,804
Int. Cl. B01j 11/40
U.S. Cl. 252—455 Z
5 Claims

ABSTRACT OF THE DISCLOSURE

Crystals of zeolite A molecular sieve are bonded into high-strength and shatter-resistant pellets, beads and the like by a composition of specific clays and silica materials of critical proportions. The clays must be of the bentonite and/or attapulgite and are preferably employed in combination. The silicas must be of the solid reactive type. The "green" agglomerates must be fired at temperatures of at least about 600° C. to achieve the desired properties.

---

This invention relates to zeolite agglomerates and to their production and particularly to shatter-resistant zeolite A agglomerates. More particularly the invention relates to clay and silica bonded bodies of a calcium-stabilized zeolite A having an average effective pore diameter of about 3 angstrom units.

The synthetic zeolitic molecular sieves of the type known generically as zeolite A are, because of their uniform pore diameters of from about 3 to about 5 A., depending on the metal cations in the crystal structure, widely used in hydrocarbon separation processes and in drying operations where it is essential to remove water from fluid streams, either to produce a dry final product or to avoid the introduction of water into further process steps.

In dynamic drying operations, i.e., where the zeolite bed is involved in continuous adsorption and desorption cycles, the zeolite crystals must be employed in an agglomerated form since the size of the individual zeolite crystals is usually only 10 microns or less. Thus not only must the crystal structure of the zeolite be stable but also the integrity of the overall agglomerate is vital to avoid such problems as decrease of the mass transfer rate through the bed and deterioration of the zeolite crystals resulting from agglomerate break-up into smaller particles.

In cracked gas drying operations, for example, adsorbent bed regeneration normally results in substantial hydrothermal abuse of both the zeolite crystals per se and the agglomerated crystal mass. It is not uncommon for the zeolite A agglomerates in such beds to be contacted by slugs of boiling or near-boiling water when the agglomerates are in an activated, i.e., substantially anhydrous state. The heat of the hot water in addition to the heat of adsorption of the water by the activated zeolite causes an enormous thermal shock to the agglomerate which is sufficient to cause shattering in conventional zeolite A agglomerates.

Because it is essential that the adsorptive capacities and characteristics of the zeolite in the agglomerate be maintained to the highest degree, when such agglomerate is to be put into contact with water or other adsorbate, the art is generally limited in the materials which can be used as binders in the zeolite bodies. For this purpose most types of clay minerals have been used either alone or in combination with silicates, alkaline earth oxides, aluminas, lignosulfonates and the like. As evidenced by the very large number of issued patents relating to zeolite agglomerates, both foreign and domestic, it is quite apparent that (a) the need for better agglomerates still exists, and (b) the chemical and/or physical mechanisms involved in bonding molecular sieve crystals are not sufficiently understood to permit agglomerate formulation with any degree of predictability as to the results.

Accordingly, it is the general object of the present invention to provide an agglomerate of zeolite A crystals which can withstand the severe thermal shock of contact with water at elevated temperatures when in the activated state.

It is another more particular object to provide a shatter-resistant agglomerate of alkaline earth-stabilized zeolite A crystals having pore diameters of about 3 angstrom units.

It is another object to provide a process for preparing the zeolite compositions of this invention.

Briefly stated, the generic embodiment of the composition-of-matter aspect of this invention comprises crystals of zeolite A bonded into a shatter-resistant agglomerate, said agglomerate comprising in addition to the zeolite crystals, a reactive solid silica, at least one clay of the types commonly known as bentonite and attapulgite, and water, said composition on a dry basis containing, by weight-percent, at least about 68 percent zeolite A crystals; from 8 to 24, preferably 8 to 16 percent, solid reactive silica; from 4 to 16, preferably 8 to 16 percent bentonite and/or attapulgite-type clay. Depending on whether it is in the unfired "green" state, loaded with adsorbed and absorbed water or activated, such agglomerate may contain from essentially zero to about 45 weight-percent water. Permissible and optional ingredients include small amounts of kaolin-type clays, extrusion and pelleting aids such as caustic soda, other zeolites present as impurities in the zeolite A as prepared, and the like.

Zeolite A and the methods of preparation thereof are defined and disclosed in U.S. Pat. No. 2,882,243 issued Apr. 14, 1959, to Robert M. Milton. In the Milton patent, incorporated herein in its entirety by reference, zeolite A is defined compositionally in terms of molar ratios of oxides as:

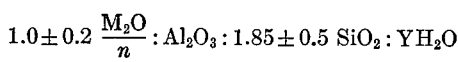

$$1.0 \pm 0.2 \frac{M_2O}{n} : Al_2O_3 : 1.85 \pm 0.5\ SiO_2 : YH_2O$$

wherein "M" represents at least one of the materials in the group consisting of hydrogen, ammonium, metals in Groups I and II of the Periodic Table, and the transition metals of the periodic table, "$n$" represents the valence of "M," and "Y" may be any value up to about 6, and having an X-ray powder diffraction pattern essentially as shown in the following table:

TABLE A $d$ value of reflection in A.

12.2±0.2
8.6±0.2
7.05±0.15
4.07±0.08
3.68±0.07
3.38±0.06
3.26±0.05
2.96±0.05
2.73±0.05
2.60±0.05

Especially preferred species of zeolite A for use in the present invention are those disclosed in copending application Ser. No. 702,803 invented by and filed contemporaneously with this application by C. R. Allenbach and F. M. O'Connor. These particular cation forms of zeolite A have the composition expressed in terms of molar ratios of oxides as follows:

$$[aK_2O + bMO + cNA_2O] : Al_2O_3 : 1.85 \pm 0.5 Si_2 : yH_2O$$

wherein $a$ has a value of from about 0.3 to 0.45; $b$ has a value of from about 0.2 to 0.35; the sum of $a+b+c$ equals $1.0 \pm 0.2$; M is at least one species of divalent cation of the alkaline earth group of metals having an atomic number of less than 126, i.e., calcium, magnesium and strontium, and $y$ has a value of from zero to 6; the X-ray powder diffraction pattern being that shown in Table A, supra. These zeolites are conveniently prepared by ion-exchange of the sodium form of zeolite A and in the as-prepared state are capable of adsorbing more than 2.5 grams $CO_2$ per 100 grams zeolite at 25° C. when subject to a $CO_2$ pressure of 250 mm. Hg for 1.5 hours. After contact with steam at temperatures of 450° C. or greater, however, pore closure occurs with the result that the $CO_2$ adsorption capacity under the same conditions decreases to less than 2.5 grams/100 grams zeolite. All forms of these zeolite A species are suitable for use in this invention.

The solid reactive silica materials essential to the compositions of this invention are to be distinguished from silica sols, silicic acid, and alkali metal silicates and the crystalline solid silicas which are well known as being inert, e.g., the several forms of quartz. Solid reactive amorphous silicas include fume silica, arc silica, chemically precipitated silicas, amorphous forms of solid silica such as kieselguhr, diatomite and the silica residues of silicate minerals originally having a continuous network of silica obtained by the controlled acid leaching of the mineral. These latter referred to minerals include naturally-occurring zeolites, chrysotile asbestos, wollastonite and sepiolite. Especially preferred are precipitated silicas having agglomerate sizes in the range of 1 to 1000μ (available commercially, for example, under the trade name "Hi-Sil," Pittsburgh Plate Glass Co., U.S.A.) and pyrogenic silica having an ultimate particle size of about 15 mμ (available commercially, for example, under the trade name "Cab-O-Sil," Cabot Corporation, U.S.A.).

Bentonite clays as the term is now commonly used include, in addition to the particular highly colloidal plastic clay found in the Cretaceous beds of Wyoming, U.S.A., the clays which contain as the dominant clay mineral, montmorillonite. Montmorillonite has the approximate chemical composition $(Mg,Ca)O:Al_2O_3:5\ SiO_2 \cdot nH_2O$ in which $n=5–7$.

Attapulgus clay in the as-mined state contains normally from about 70 to 80 percent attapulgite. During processing the attapulgite content is increased to 85 to 90% attapulgite as a result of the removal of quartz, calcite and the like. The composition of the ideal cell of attapulgite established by W. F. Bradley as $$(OH_2)_4Mg_5Si_8O_{20} \cdot 4H_2O$$

is generally accepted. A detailed discussion of the structure, physical properties, composition, location, processing, etc., is to be found in Ind. & Eng. Chem., vol. 59, No. 9, pages 59–69 (1967), by Haden, Jr., et al.

Chemical analyses in wt.(percent) representative of two commercial samples of bentonite-type clays used in the examples hereinafter appearing are shown in Table B.

TABLE B

|  | "Bentolite L"* | "Volclay 200"** |
|---|---|---|
| $SiO_2$ | 65.20 | 64.32 |
| $Al_2O_3$ | 16.30 | 20.74 |
| $Fe_2O_3$ | 0.30 | 3.03 |
| $TiO_2$ |  | 0.14 |
| $MgO$ | 4.10 | 2.30 |
| $CaO$ | 1.60 | 0.52 |
| $K_2O$ | 0.04 | 0.39 |
| $Na_2O$ | 0.19 | 2.69 |
| $FeO$ |  | 0.46 |
| $P_2O_5$ |  | 0.01 |
| L.O.I. | 12.16 | 13.1 |

*Georgia Kaolin Co., U.S.A.
**American Colloid Corporation, U.S.A.

In forming the agglomerates of this invention the manipulative steps are not narrowly critical. In general the zeolite, if used directly as it is taken from the filter press following crystallization and/or ion exchange, is broken up in a muller. The solid reactive silica is then added and mulling continued for about 10 minutes. To the mulled mixture of silica and zeolite crystals is added the attapulgus and/or bentonite clay constituent and sufficient water to bring the moisture content to between about 34 and 42 weight percent of the overall mixture. The resultant mixture is mulled for about 15 to 30 minutes or so but preferably not longer than about 2 hours. If extrusion aids such as sodium hydroxide are to be included in the mix, they are conveniently added along with the solid silica.

From the resulting pliant mass pellets are readily produced by extrusion, or beads or tablets can be formed according to well known procedures. The "green" bodies are fired for about 30 minutes in a forced draft furnace with an adequate air purge at 600 to 650° C. When the zeolite in the agglomerate is the calcium cation stabilized potassium 3A zeolite (discussed supra) the purge gas can advantageously be or contain steam.

The following examples will serve to illustrate the invention. In the presentation of comparative physical properties, data for pellet crush strength and shatter resistance (in terms of a "Boiling Water Test") are presented. The test procedures are as follows:

CRUSH STRENGTH TEST

The apparatus used for this test is a modified spring tester on which the pellet is compressed against an anvil located on a spring-supported platen by a second movable platen. The crushing load, in pounds, is indicated directly on a dial scale built into the tester. The pellets are crushed on a diameter across a narrow anvil so that the length of the pellet crushed is constant. Pellets ⅛-inch diameter are crushed on a ¼-inch wide anvil; pellets 1/16-inch diameter are crushed on a ⅛-inch wide anvil. The anvil is supported on rollers on its platen to prevent any lateral or rolling motion from being imparted to the pellet.

BOILING WATER TEST

The pellets, beads or other shapes of agglomerate to be tested are screened to insure uniform size and activated (dehydrated) for 16 hours at 350° C. A 100-gram quantity is dropped into boiling water and allowed to remain for five minutes. After removal, they are dried for about one hour at 100° C. The agglomerates are re-screened while shaking for 10 minutes. The weight fraction retained on the screen is the percent retention of pellet integrity.

According to the preferred aspect of this invention, the activated agglomerates of zeolite A are characterized by having at least 95% retention of pellet integrity by the boiling water test and a crush strength (⅛-inch pellet, extruded) of at least 20 pounds.

Example 1.—Preparation of sodium zeolite A

Sodium zeolite A was prepared by the following procedure: Solution "A" was made up initially from 400 ml. of distilled water, 160 grams of reagent grade sodium hydroxide (NaOH) and 156 grams or reagent grade $Al(OH)_3$. After heating and agitation to dissolve the solids, the solution was made up to a volume of 1000 ml. with distilled water. Solution "B" was made up initially from 1500 ml. of distilled water, 80 grams of reagent grade sodium hydroxide and 150 grams of reagent grade silicic acid. After stirring to dissolve the solids, the solution was made up to a volume of 2000 ml. with distilled water. Solutions "A" and "B" were then combined with mixing for one minute. The overall reactant composition of the resultant mixture was, in terms of mole ratios of oxides, $Na_2O/SiO_2$ ---------------------------------- 1.44
$SiO_2/Al_2O_3$ ---------------------------------- 2.2
$H_2O/NA_2O$ ---------------------------------- 53

The above mixture was heated for 16 hours at 90° C. The reaction magma was then filtered to recover the crystals from the mother liquor. After washing and drying, samples of product were taken for X-ray, chemical, and adsorption analyses. The X-ray spectrometer pattern showed that the product was virtually 100% sodium zeolite A. The chemical analysis was as follows:

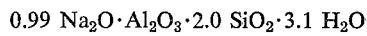

0.99 $Na_2O \cdot Al_2O_3 \cdot 2.0$ $SiO_2 \cdot 3.1$ $H_2O$

The $CO_2$ adsorption at 250 mm. Hg and 25° C. was 17.3 wt. percent.

Example 2.—Preparation of calcium stabilized potassium zeolite A

Approximately 91 grams (dry weight) of the sodium zeolite A of Example 1 was added to a salt solution of 45 grams KCl and 9 grams $CaCl_2$ dissolved in 490 ml. water. The zeolite was allowed to remain in the solution for 30 minutes at 25° C. and was then separated by filtration and washed with water until the washings were free of chloride ion. The $CaO/Al_2O_3$ molar ratio of the product was found to be 0.24, the $K_2O/Al_2O_3$ molar ratio was 0.37, and the $Na_2O/Al_2O_3$ molar ratio was 0.37.

cent final moisture content) was fed to a laboratory extruder fitted with a 1/8-inch die plate. Good extrusion performance was observed. The 1/8-inch "green" pellets from the extruder were first dried for 72 hours at 90° C. in a circulating air dryer, and then fired (activated) in a forced-draft kiln at 625° C. with adequate air purge for 30 minutes. Properties of samples of product were measure with the following result:

Pellet density, lbs./ft.$^3$ ---------------------------- 75.0
Crush strength, lb.:
    Activated ---------------------------------- 37.4
    Hydrated ---------------------------------- 17.5
$CO_2$ adsorption (250 mm. Hg, 25° C.) ---------- 1.3
Pellet integrity retention, percent -------------- 98.5

EXAMPLES 4–11

A number of agglomerates of the zeolite product of Example 2 were prepared using the method typified by the procedure of Example 3. In some samples silica was omitted from the composition altogther. In others less than the 8 weight percent (dry basis) of silica required by this invention was used. In some samples kaolin was used in place of or mostly in place of a bentonite or an attaplugus clay. All samples were prepared by the same manipulative steps and activated and hydrated to the same degree for testing purposes. In the table below, the composition of the agglomerates in the form of 1–8 inch extruder pellets and their physical properties are set forth. Only those compositions coming within the scope of this invention are accorded example numbers. The comparison samples are identified by capital letters.

As used herein, the term "dry basis" refers to the weight of a given powdered or granular material adjusted for the amount of moisture contained in a sample of as-received material, wherein such moisture content is determined on the "Ohaus" Moisture Determination Balance, using a 600° C. ignition temperature for said sample.

| Example | Composition, wt. percent, dry basis | | | Pellet density, lb./ft.$^3$ | Crush strength, lbs. | | Adsorption, g./100 g. pellets | | Boiling water test, percent retention |
|---|---|---|---|---|---|---|---|---|---|
| | Zeolite | Silica | Clay | | Activated | Hydrated | $CO^2$ [a] | $H_2O$ [b] | |
| A | 78 | 14 | 6% kaolin plus 2% bentonite | 65.2 | 9.8 | 4.8 | | | 56.1 |
| B | 78 | 11 | 11% kaolin | 68.2 | 15.2 | 6.1 | | | 47.8 |
| C | 78 | 8 | 12% kaolin plus 2% bentonite | 67.2 | 15.0 | 5.9 | | | 44.9 |
| D | 80 | 6 | 14% bentonite | 72.8 | 42.3 | 16.3 | 1.2 | 21.7 | 89.3 |
| E | 86 | 0 | 14% bentonite | 69.4 | 34.6 | 11.9 | 1.1 | 22.5 | 89.2 |
| 4 | 76 | 12 | 12% bentonite (Bentolite-L) | 74.2 | 27.7 | 15.3 | | | 96.4 |
| 5 | 76 | 12 | 12% bentonite (Volclay) | 74.6 | 40.8 | 16.0 | 1.4 | 21.7 | 96.6 |
| 6 | 74 | 14 | 12% bentonite | 74.8 | 35.5 | 17.4 | 1.3 | | 99.0 |
| 7 | 78 | 14 | 8% bentonite | 72.4 | 27.4 | 12.9 | 1.2 | 21.7 | 98.1 |
| 8 | 76 | 14 | 5% attapulgus plus 5% bentonite | 70.5 | 20.4 | 11.5 | | | 98.3 |
| 9 | 76 | 16 | 8% bentonite | 71.6 | 27.4 | 13.0 | | | 98.2 |
| 10 | 76 | 12 | 12% bentonite | 73.0 | 37.6 | 17.7 | | | 99.1 |
| 11 | 76 | 8 | 8% bentonite plus 8% attapulgus | 74.5 | 26.3 | 12.2 | | | 98.1 |

[a] $CO_2$ pressure of 250 mm. Hg at 25° C. for 1.5 hours.
[b] $H_2O$ pressure of 17.6 mm. Hg at 25° C.

Example 3.—Typical process for preparing a silica-clay bound agglomerate

A "Mix-Muller" was charged 4535 grams (2960 grams dry basis) of Type 3A calcium-stabilized zeolite (prepared by the procedure typified in Examples 1 and 2 above) and 711.0 grams of water. This mixture was mulled for three minutes. To this was added a mixture of 623.0 grams (560.0 grams dry basis) of "Hi-Sil 233" and 24.6 grams (18.65 grams dry basis) of caustic soda (NaOH), and mulling was continued from an additional ten minutes. Next, 537.0 grams (480.0 grams dry basis) of "Volclay No. 200" were added and mulling was continued for one hour. At the conclusion of the mulling period the plastic mix (74 wt.-percent 3A, 14 wt.-percent silica, 12 wt.-percent clay, on a dry basis; 36.4 wt.-per-

What is claimed is:
1. Shatter-resistant agglomerates comprising on a dry weight basis at least about 68 percent zeolite A crystals, from about 8 to about 24 percent solid reactive amorphous silica, from about 4 to about 16 percent of a clay selected from the class type consisting of bentonite and attapulgus and mixtures thereof.
2. Agglomerates according to claim 1 in which the zeolite A has a pore diameter of about 3 angstrom units and has the composition expressed in terms of mole ratios of oxides as follows:

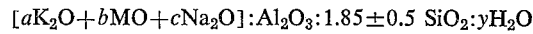

$[aK_2O+bMO+cNa_2O]:Al_2O_3:1.85\pm0.5$ $SiO_2:yH_2O$ wherein $a$ has a value of from about 0.3 to 0.45; $b$ has a value of from about 0.2 to 0.35; the sum of $a+b+c$ equals 1.0±0.2; M is at least one species of divalent cation of the alkaline earth group of metals having an atomic number less than 126; and $y$ has a value of from zero to about 6.

3. Agglomerates according to claim 1 wherein the clay and the solid reactive amorphous silica are each present in an amount of from 8 to 16 weight percent.

4. Agglomerate according to claim 3 wherein the clay is present in an amount of about 16 weight percent, said clay comprising essentially equal parts by weight of a bentonite clay and an attapulgus clay.

5. Agglomerate according to claim 2 wherein M represents the calcium cation.

References Cited

UNITED STATES PATENTS

| | | | |
|---|---|---|---|
| 3,262,890 | 7/1966 | Mitchell et al. | 252—455 |
| 3,287,281 | 11/1966 | Haden, Jr. et al. | 252—455 |
| 3,436,357 | 4/1969 | Plank et al. | 252—455 |
| 2,983,670 | 5/1961 | Sewbold, Jr. | 252—455 X |
| 3,140,253 | 7/1964 | Plank et al. | 252—455 X |
| 3,193,493 | 7/1965 | Bourquet et al. | 23—113 X |
| 3,224,167 | 12/1965 | Jones | 23—113 X |

DANIEL E. WYMAN, Primary Examiner

C. F. DEES, Assistant Examiner